VOLTAGE SENSING APPARATUS
Filed July 16, 1965
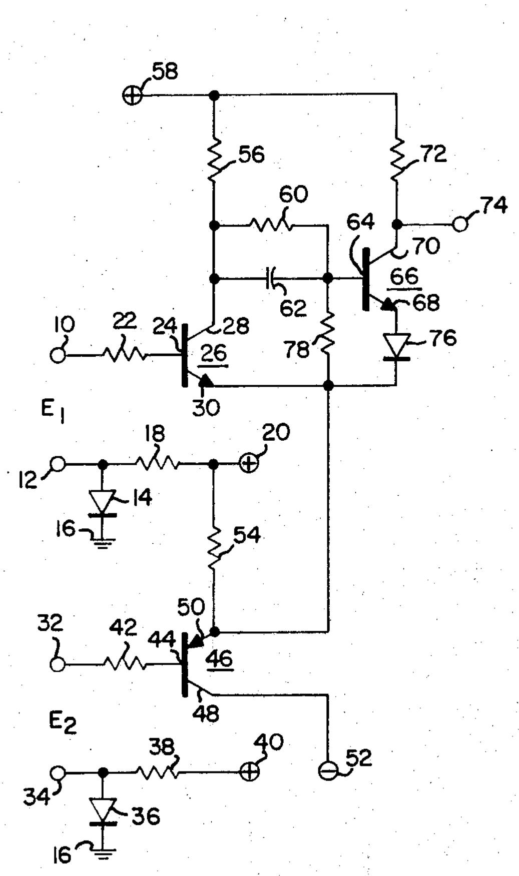
INVENTOR.
FREDERICK F. BECK
BY Bruce C Lutz
ATTORNEY 3,356,863
VOLTAGE SENSING APPARATUS
Frederick F. Beck, Glendora, Calif., assignor to Honeywell Inc., Minneapolis, Minn., a corporation of Delaware
Filed July 16, 1965, Ser. No. 472,564
6 Claims. (Cl. 307—88.5)

ABSTRACT OF THE DISCLOSURE

A variable voltage sensitive circuit which is temperature insensitive due to the fact that the voltage sensitive portion comprises transistors which are either entirely in an ON or an OFF condition and the reference signal is basically stable because it depends on the emitter base voltage drop of a variable reference level circuit which is utilized to vary the voltage at which the circuit is actuated.

This invention is directed generally to electronic circuits and more specifically to a circuit useful in comparing one voltage level with another or with comparing an input voltage level to a reference.

While the prior art has had many voltage level detectors and voltage comparison circuits, one of the big disadvantages of the prior art circuits is that there has been a large amount of hysteresis. Hysteresis is defined in this specification as the variation in the magnitude of the input signal, while the reference is held constant, between the two switching conditions of the circuit. In other words, after an input voltage has been raised to a point where a circuit switches to a first condition, it is the variation necessary as the input voltage is lowered until the circuit switches back to its original or second condition. A second downfall of the prior art circuits is the influentiality thereof by temperature variations and, therefore, error is introduced through changes in temperature. Since the two switching transistors which detect voltage levels operate in either an ON or an OFF condition, temperature changes cause very little error or drift in their operation. The remaining transistor has some variation in voltage drop from emitter to base but this is very small compared with the prior art circuits. This small variation is removed by the use of temperature compensating diodes to produce a relatively temperature stable switching circuit for use in level detection.

Various objects and advantages may be ascertained from the above discussion of the prior art in combination with the specification and appended claims along with the single figure which is a schematic diagram of one particular embodiment of the invention.

In the circuit, an input signal is applied between input terminals 10 and 12. A diode 14 is connected between input terminal 12 and reference potential 16. The diode 14 is used for temperature compensation and is connected such that its direction of easy current flow is towards reference potential 16. Input terminal 12 is also connected through a resistance element 18 to a positive power terminal 20. Input terminal 10 is connected through a resistor 22 to the base 24 of an NPN transistor 26 having a collector 28 and an emitter 30. A reference signal or the signal to be compared with the first input signal is applied between terminals 32 and 34. A second diode or temperature compensating means 36 is connected between the input terminal 34 and reference potential 16 so that the direction of easy current flow is towards reference potential 16. A resistive element 38 is connected between input terminal 34 and a positive power terminal 40 which may be connected to the same source as previously mentioned terminal 20. A resistance element 42 is connected between input terminal 32 and a base 44 of a PNP transistor 46 having a collector 48 and an emitter 50. Collector 48 is connected to a negative power terminal or power supply means 52. A resistive element 54 is connected between the emitter 50 of transistor 46 and the positive power terminal 20. A resistive element 56 is connected between collector 28 and a positive power terminal 58 which may be connected to the same source as positive power terminal 20. A resistive element 60 is connected in parallel with a capacitive element or impedance means 62 between collector 28 of transistor 26 and a base 64 of an NPN transistor means 66 having an emitter 68 and a collector 70. A resistive element 72 is connected between collector 70 and positive power terminal 58. An output terminal designated as 74 is connected to collector 70 of transistor 66. A diode or voltage dropping means 76 is connected between emitter 68 and emitter 50 of transistor 46. Emitter 30 of transistor 26 is connected to emitter 50 of transistor 46. A resistive element 78 is connected between base 64 of transistor 66 and emitter 50 of transistor 46. Diode 76 has been connected so that current flow is in the same direction as current flow through transistor 66.

While for convenience each of the transistors has been designated as a transistor, it is to be realized that the terms switching means, semiconductor means, valve means, amplifying means, and detection means are equally applicable. Also, since the various transistors use either the collector or the emitter for providing the output signal, these parts may be designated first and second output means. Further, while the resistors have been designated as such, it is to be realized that these, as well as the single capacitor shown, may be designated as impedance means or in the appropriate cases load means or biasing means.

In describing the operation of this circuit, E1 will be used to designate the input signal and E2 will be used to designate the reference potential or signal. With the proper design or relation of components, the designations E1 and E2 may refer either to current or to voltage levels. It will be assumed that initially the magnitude of E2 is greater than the magnitude of E1. The potential appearing at emitter 50 of transistor 46 will be approximately the same potential as that appearing at terminal 32. This occurs because transistor 46 acts much like an emitter follower, and the potential at emitter 50 will follow the potential at base 44. In this initial description, the action of diodes 14 and 36 will be overlooked since in many applications of this circuit their function will not be necessary in view of the inherent temperature stability of the circuit without these temperature compensating means. Since it was initially assumed that E2 was of a greater magnitude than E1, it necessarily follows that the magnitude of the voltage appearing on emitter 50 and, therefore, emitter 30 of transistor 26 is also higher than the potential of E1 and accordingly higher than base 24 of transistor 26. This means that transistor 26 will be in an OFF condition. Since transistor 26 is OFF, the voltage at collector 28 will be very close to the potential power supply 58. A large amount of bias current will flow through resistor 60 to the base 64 of transistor 66 and turn this transistor to an ON condition. The output terminal 74 will thus be at a potential above the input terminal 32 by an amount equal to the voltage drops in the emitter base junction of transistor 46, the voltage drop through diode 76, and the voltage drop from collector to emitter of transistor 66. Thus as long as the potential applied to terminals 58 and 52 are of a greater magnitude with respect to ground potential than either the input voltages E1 or E2, the output appearing at terminal 74 will be essentially the same as the voltage E2 when it is larger than E1.

It may be assumed that E1 now rises until it is slightly higher in potential than E2. At this point, transistor 26 will start to turn to an ON condition. This initiation of current conduction by transistor 26 will lower the potential at collector 28 by a slight amount. This action will reduce the biasing current to transistor 66 and accordingly reduce the current flow through transistors 66 and 46. With the current flow is reduced through transistor 46, the voltage at emitter 50 will be reduced slightly thereby aiding the turn on of transistor 26. This action continues in a regenerative manner until transistor 26 is turned on and transistor 66 is turned off. With transistor 66 turned off, the output terminal 74 is essentially at the potential of power terminal 58. The collector 28 of transistor 26 now is at approximately the potential of E2 and is above this potential only by the amount of the voltage drops of collector to emitter of transistor 26 and emitter to base of transistor 46. Transistor 66 is held off by the voltage drop of diode 76 in combination with collector 28 being at a lower potential than the emitter 68 of transistor 66. As may be noted, under these conditions no bias current is received by transistor 66 through resistor 60.

If the potential of E1 now becomes slightly less than the potential of E2, transistor 26 will start to turn off and the collector 28 will start to raise in potential. This rise in potential will start the conduction of transistor 66 and thereby increase the current flow through transistor 46 to raise slightly the potential of emitter 50. This rise in potential in emitter 50 will slightly raise the potential of emitter 30 and increase the turn off speed of transistor 26 in a regenerative manner. This action continues until transistor 26 is in an OFF condition and transistor 66 is again in an ON condition. Capacitor 62 serves to bypass the resistor 60 so as to increase the switching speed of the circuit during both changes in switch conditions. The ON, OFF voltage differential previously described as hysteresis in one embodiment of the circuit is somewhat less than 100 millivolts. This value can be further decreased by reducing the magnitude of resistance or resistors 22 and 42 and/or by adding an additional emitter follower stage or amplifying stage prior to transistor 46. Any of these actions will increase the circuit sensitivity and, therefore, decrease the hysteresis.

As may be determined from the above description of the circuit and of the operation, the circuit can be used either to sense a particular voltage level by keeping E2 constant and sensing the level of E1 or it can be used as a comparative circuit for providing an output indicative of which of the two input voltages E1 or E2 is of the largest magnitude in a given polarity direction. As will be realized, the circuit can readily be adapted to use the opposite polarity signals by reversing the polarity type of the transistors used and the power supply voltages. Further, by gating the two inputs, E1 and E2, through diodes such that transistor 26 operates on negative voltages with respect to ground and transistor 46 operates on negative voltages with respect to ground, the circuit will indicate a magnitude (negative or positive) of voltage differential between the two inputs and reference or ground potential.

As previously mentioned, since transistors 26 and 66 operate in either an OFF or an ON condition, temperature causes very few problems. The small variation which may occur in transistors 26 and 46 between base to emitter are compensated by the use of the diodes 14 and 36 along with resistors 18 and 38. Any change in voltage drop from base to emitter of the transistors 26 and 46 are compensated by a corresponding change in the offset across diodes 14 and 36 respectively.

As may be noted by those skilled in the art, the circuit shown, if transistor 46 were replaced by a resistor, would be very similar to a Schmitt trigger, however, it is transistor 46 which provides the low hysteresis and permits voltage control of the detection level. Transistor 46 also provides operation somewhat similar to that of a differential amplifier, however, a differential amplifier does not have the regenerative switching and high thermal stability available in the present invention. Thus, this invention comprises a trigger circuit utilizing transistors 26 and 66 in combination with an additional variable voltage 46 to produce a new and novel voltage comparator or level detection circuit having a low hysteresis characteristic.

While only a single embodiment of this invention has been shown and described, it is realized that many variations of the circuit will occur to those skilled in the art, and I wish to be limited only by the scope of the appended claims in which I claim:

1. Switching apparatus of the class described comprising in combination:

first transistor means of a first polarity type having input means and first and second output means;

second transistor means of the first polarity type having input means and first and second output means;

third transistor means of a second polarity type having input means and first and second output means;

first and second power supplying terminal means;

first, second, and third impedance means connected between said first power supplying means and said first output means of said first, second, and third transistor means respectively;

fourth impedance means connecting said first output means of said first transistor means to said input means of said second transistor means for supplying a signal thereto;

first means for supplying a reference level signal including first and second terminal means;

second means for supplying an input signal to be compared with the reference signal including first and second terminal means;

reference potential means;

first and second temperature compensating diode means connected between said reference potential means and said first terminal means of said first and second means respectively;

third means for connecting said second terminal means of said second means to said input means of said first transistor means to supply the input signal thereto;

fourth means for connecting said second terminal means of said first means to said input means of said third transistor means to supply the reference level signal thereto;

fifth means for connecting said second output means of said third transistor means to said second power supply means;

sixth means for connecting said second output means of said first transistor means to said second output means of said second transistor means and to said first output means of said third transistor means; and apparatus output means connected to said first output means of said second transistor means for supplying a first output signal when the magnitude of said input signal is less than said reference signal and for supplying a second output signal when the magnitude of said input signal is greater than said reference signal.

2. Switching apparatus of the class described comprising, in combination:

first valve means having input means and first and second output means;

second valve means having input means and first and second output means;

third valve means having input means and first and second output means;

first and second power supplying terminal means;

first, second, and third impedance means connected between said first power supplying means and said first output means of said first, second, and third transistor means respectively;

fourth impedance means connecting said first output means of said first valve means to said input means of said second valve means for supplying a signal thereto;

first means for supplying a reference level signal including first and second terminal means;

second means for supplying an input signal to be compared with the reference signal including first and second terminal means;
reference potential means;
first and second temperature compensating diode means connected between said reference potential means and said first terminal means of said first and second means respectively;
third means for connecting said second terminal means of said second means to said input means of said first valve means to supply the input signal thereto;
fourth means for connecting said second terminal means of said first means to said input means of said third valve means to supply the reference level thereto;
fifth means for connecting said second output means of said third valve means to said second power supplying means;
sixth means for connecting said second output means of said first valve means to said second output means of said second valve means and to said first output means of said third valve means; and
apparatus output means connected to said first output means of said second valve means for supplying a first output signal when the magnitude of said input signal is less than said reference signal and for supplying a second output signal when the magnitude of said input signal is greater than said reference signal.

3. Switching apparatus of the class described comprising, in combination:
first transistor means of a first polarity type having input means and first and second output means;
second transistor means of the first polarity type having input means and first and second output means;
third transistor means of a second polarity type having input means and first and second output means;
first and second power supplying terminal means;
means connecting said first power supplying means to said first output means of said first, second, and third transistor means respectively;
impedance means connecting said first output means of said first transistor means to said input means of said second transistor means for supplying a signal thereto;
first means for supplying a reference level signal including first and second terminal means;
second means for supplying an input signal to be compared with the reference signal including first and second terminal means;
reference potential means connected to said first terminal means of said first and second means respectively;
third means for connecting said second terminal means of said second means to said input means of said first transistor means to supply the input signal thereto;
fourth means for connecting said second terminal means of said first means to said input means of said third transistor means to supply the reference level signal thereto;
fifth means for connecting said second output means of said third transistor means to said second power supplying means;
sixth means for connecting said second output means of said first transistor means to said second output means of said second transistor means and to said first output means of said third transistor means, and
apparatus output means connected to said first output means of said second transistor means for supplying a first output signal when the magnitude of said input signal is less than said reference signal and for supplying a second output signal when the magnitude of said input signal is greater than said reference signal.

4. Switching apparatus of the class described comprising, in combination:

first valve means having input means and first and second output means;
second valve means having input means and first and second output means;
variable voltage means having input means and first and second output means;
reference potential means;
first and second power supplying terminal means for supplying first and second potentials with respect to the reference potential;
means connecting said first power supplying means to said first output means of said first and second valve means and said variable voltage means respectively;
means connecting said first output means of said first valve means to said input means of said second valve means for supplying a signal thereto;
first means for supplying a reference level signal with respect to said reference potential means;
second means for supplying an input signal with respect to said reference potential means to be compared with the reference signal;
third means for connecting said second means to said input means of said first valve means to supply the input signal thereto;
fourth means for connecting said first means to said input means of said variable voltage means to supply the reference level signal thereto;
fifth means for connecting said second output means of said variable voltage means to said second power supplying means;
sixth means for connecting said second output means of said first valve means to said second output means of said second valve means and to said first output means of said variable voltage means; and
apparatus output means connected to said first output means of said second valve means for supplying a first output signal when the magnitude of said input signal is less than said reference signal and for supplying a second output signal when the magnitude of said input signal is greater than said reference signal.

5. Apparatus of the class described comprising, in combination:
first and second power supply means;
transistor means including base, emitter, and collector, said emitter connected to said first power supply means for receiving power therefrom;
first means for supplying an input signal;
second means for supplying a reference signal connected to said base means of said transistor means;
third means connecting said collector to said second power supply means;
triggering circuit means for providing a change in output when an input signal is greater than a predetermined amount with respect to a reference level, said triggering circuit means including input means, and output means and further having first and second connection points for connection to power and reference potentials respectively;
means connecting said first and second connection points between said first power supply means and said emitter of said transistor means, the transistor means altering the reference level of said triggering circuit means in response to said reference signal; and
means connecting said first means to said input means of said triggering circuit means for supplying input signals thereto, said triggering circuit means supplying outputs in accordance with the signal differential between said input means and said second connection point.

6. Apparatus of the class described comprising, in combination:
first and second power supply means;
variable voltage means including input and first and second output means, said first output means connected to said first power supply means for receiving power therefrom;

first means for supplying an input signal;

second means for supplying a reference signal connected to said input means of said variable voltage means;

third means connecting said second power supply means to said second output means of said variable voltage means;

triggering circuit means for providing a change in output when an input signal is greater than a predetermined amount with respect to a reference level, said triggering circuit means including input means, output means and first and second connection points;

means connecting said first and second connection points respectively between said first power supply means and said first output means of said variable voltage means, the variable voltage means altering the reference level of said triggering circuit means in response to said reference signal; and means connecting said first means to said input means of said triggering circuit means for supplying input signals thereto, said triggering circuit means supplying outputs in accordance with the signal differential between said input means and said second connection point.

References Cited

UNITED STATES PATENTS

| | | | |
|---|---|---|---|
| 2,949,546 | 8/1960 | McVey | 307—88.5 |
| 3,106,646 | 10/1963 | Carter | 307—88.5 |
| 3,176,224 | 3/1965 | Lampke | 328—146 X |
| 3,310,688 | 3/1967 | Ditkofsky | 328—146 X |

ARTHUR GAUSS, *Primary Examiner.*

J. A. JORDAN, *Assistant Examiner.*